United States Patent [19]

Kuga et al.

[11] Patent Number: 4,499,546
[45] Date of Patent: Feb. 12, 1985

[54] NUMERICAL CONTROL MACHINE TOOL WITH SLIDING ERROR COMPENSATION FUNCTION

[75] Inventors: Akihiko Kuga, Iruma; Hiroo Kuga, Mitaka, both of Japan

[73] Assignee: Kabushiki Kaisha Yaskawa Denki Seisakusho, Nagano, Japan

[21] Appl. No.: 376,983

[22] Filed: May 10, 1982

[30] Foreign Application Priority Data

May 19, 1981 [JP] Japan .................................. 56-74234

[51] Int. Cl.³ ....................... G06F 15/46; G05B 19/18
[52] U.S. Cl. .................................... 364/474; 318/569; 318/632; 364/170
[58] Field of Search .............................. 364/167–171, 364/174, 474, 475; 318/572, 569, 570, 632

[56] References Cited

U.S. PATENT DOCUMENTS

| | | | |
|---|---|---|---|
| 3,612,840 | 10/1971 | Stobbe | 364/170 X |
| 3,684,874 | 8/1972 | Kelling | 364/170 X |
| 4,035,706 | 7/1977 | Cutler | 364/170 X |
| 4,074,349 | 2/1978 | Ueda | 364/170 X |
| 4,338,659 | 7/1982 | Kurakake | 364/170 |

Primary Examiner—Joseph F. Ruggiero
Attorney, Agent, or Firm—Ladas & Parry

[57] ABSTRACT

In a numerical control machine tool, the sliding errors are compensated by control means comprising: a position detector for detecting a current position on a first axis at all times in association with a first-axis position detector; a compensation data memory in which compensation data for a second axis corresponding to positions on the first axis have been stored, the memory outputting a compensation data corresponding to a position which coincides with a current position specified by the position register; a pulse generator means for calculating the difference between the current compensation data and the preceding compensation data and generating a pulse train proportional to the difference; an adder for subjecting to addition or subtraction the pulse train generated and a pulse train obtained by converting the output signal of a second-axis position detector; a pulse restoring means for converting the output pulse train of the adder into a signal similar in form to the output of the position detector; and a compensation control means for outputting as a position feedback signal for the second axis the signal outputted by the pulse restoring means, and for similarly processing the output signal of the second axis position detector to provide as a position feedback signal for the first axis the output signal thus processed.

2 Claims, 12 Drawing Figures

F I G. 2
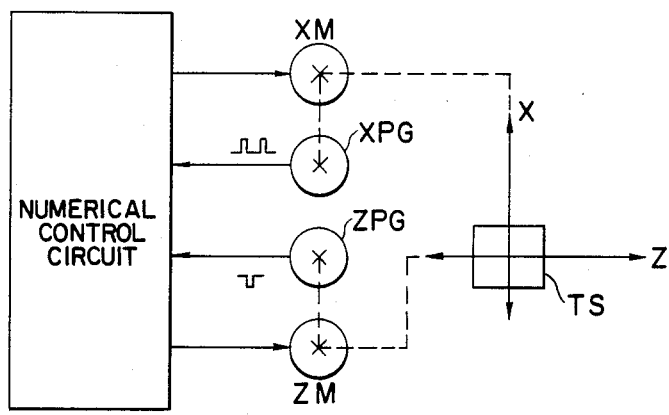
F I G. 3
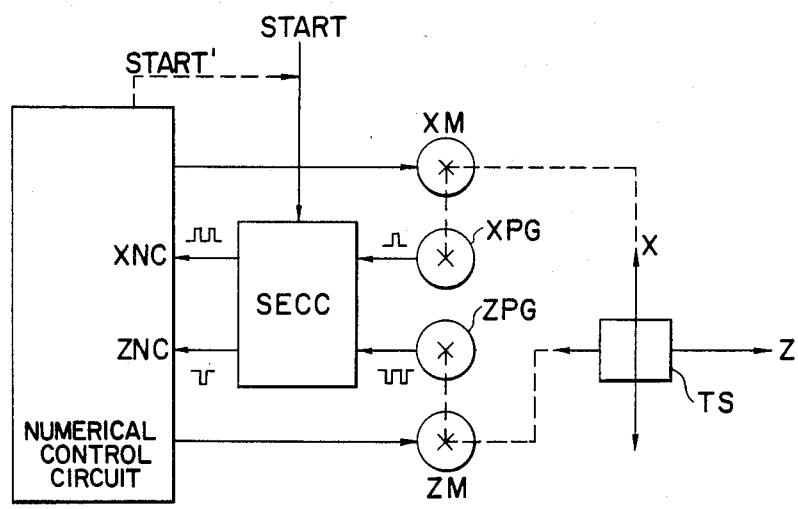

SLIDING ERROR COMPENSATION CONTROL

NUMERICAL CONTROL MACHINE TOOL WITH SLIDING ERROR COMPENSATION FUNCTION

BACKGROUND OF THE INVENTION

This invention relates to numerical control machine tools such as numerical control lathes, and more specifically to an improvement in numerical control machines.

The tool slide of a numerical control lathe, which is movable in the X-axis and Z-axis direction, involves sliding errors, namely, a parallelism error which occurs when the direction of movement of the tool slide on the Z-axis is not parallel to the center line of rotation of the main spindle, and a right-angle error which occurs when the direction of movement of the tool slide on the X-axis is not orthogonal to the center line of rotation of the main spindle.

The sliding errors of the tool slide may be attributed to mechanical errors which are caused in manufacturing or assembling the lathe, and include a straightness error which occurs when the movements of the tool slide on the X-axis and the Z-axis are not straight, in addition to the above-described parallelism error and right-angle error with respect to a reference line (such as the center line of the main spindle).

In FIG. 1(a), the parallelism error of the Z-axis and the right-angle error of the X-axis with respect to the center line CL of the main spindle SP are represented by angles α and β, respectively.

FIG. 1(b) shows axes X' and Z' which have straightness errors, i.e., wind, in comparison with the ideal axes X and Z which has zero straightness error.

Heretofore, where the sliding errors exceed the allowable values, no method of compensating the sliding errors was provided for a numerical control machine tool. Accordingly, in order to eliminate the error, the machine tool was, for example, disassembled and then is assembled again. If the extent of sliding errors was excessive, the essential parts of the machine tool were machined again, which was a very costly procedure.

SUMMARY OF THE INVENTION

Accordingly, an object of this invention is to provide a numerical control machine tool in which the above-described sliding errors can be compensated by control means without adjusting the mechanical parts thereof, whereby the machining accuracy is remarkably improved.

The foregoing object and other objects of the invention have been achieved by the provision of a numerical control machine tool in which linear or rotary position detectors which produce incremental pulse trains with motion on control axes are provided as position feedback equipment for the control axes, respectively; which, according to the invention, comprises: a position register for detecting a current position on a first axis at all times in response to an output signal from a first-axis position detector; a compensation data memory in which compensation data for a second axis corresponding to a number of positions on the first axis have been stored in advance, the memory outputting a compensation data corresponding to a position which coincides with a current position specified by the position register; a pulse generator section for calculating a difference between the compensation data thus outputted and a preceding compensation data outputted by the memory and generating a pulse train the number of pulses of which is proportional to the difference; a pulse adder for adding the pulse train obtained for the first axis to a pulse train which is obtained by converting an output signal of a second-axis position detector, or subtracting the former pulse train from the latter pulse train; a pulse restoring section for converting a pulse train which is provided as a result of the calculation by the pulse adder into a signal which is similar in form to the output from the position detector; and a compensation control section for outputting, as a position feedback signal for the second axis, the signal outputted by the pulse restoring section, and for similarly processing an output signal from the second-axis position detector to be output, as a position feedback signal for the first axis, thus having a sliding error compensation function.

The nature, principle and utility of the invention will become more apparent from the following detailed description when read in conjunction with the accompanying drawings.

BRIEF DESCRIPTION OF THE DRAWINGS

In the accompanying drawings:

FIG. 2 is a block diagram showing a conventional numerical control lathe with rotary position detector means;

FIG. 3 is a block diagram showing one embodiment of this invention;

DETAILED DESCRIPTION OF THE INVENTION

This invention may be used for a numerical control machine tool which employs as position feedback equipment linear or rotary position detectors which produce incremental pulse trains with motion on control axes.

One example of the machine tool is a conventional numerical control lathe with rotary position detectors PG coupled to axis drive motors as shown in FIG. 2.

A numerical control section NCC operates to drive an X-axis motor XM and a Z-axis motor ZM while receiving as position data incremental pulse trains from an X-axis position detector XPG and a Z-axis position detector ZPG, so that a tool slide TS is moved in the X-axis direction and in the Z-axis direction. In this connection, one pulse represents the minimum movement unit (for instance 0.001 mm) of the motion axis.

One embodiment of this invention is as shown in FIG. 3. That is, the invention is a system in which a sliding error compensation control section SECC is connected between the position detectors XPG and ZPG and the conventional numerical control section NCC, to eliminate a sliding error.

A start input signal START is applied to the sliding error compensation control section SECC solely or in response to an instruction from the numerical control section NCC, so that the compensation function is activated.

The sliding error compensation control section SECC will be described in more detail.

Figure 1A:
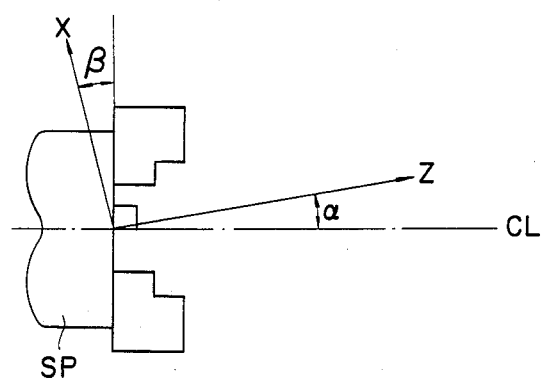
FIG. 1(a) is an explanatory diagram showing a parallelism error of the Z-axis and a right-angle error of the X-axis in the movement of the tool slide with respect to the center line of the main spindle.
Figure 1B:
FIG. 1(b) is an explanatory diagram showing straightness errors in the X and Y axis of the machine tool.
Figure 4:
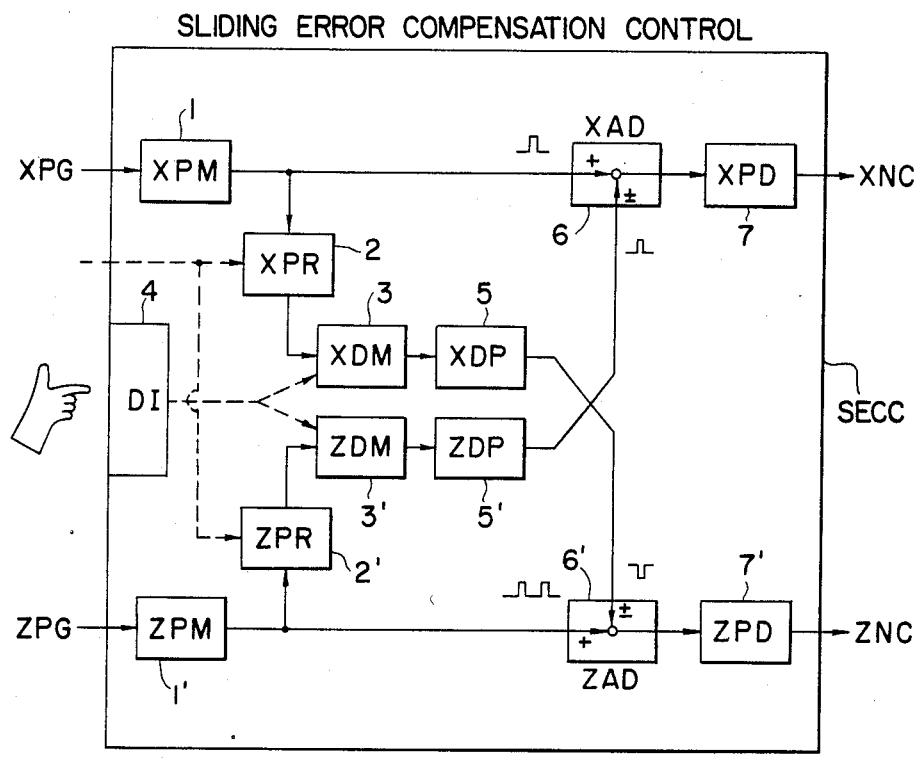
FIG. 4 is a block diagram for a description of the operation of a sliding error compensation control (SECC) section in FIG. 3.

FIG. 4 is a diagram useful for describing the operation of the sliding error compensation control section SECC. First, the functions of various control parts thereof will be described.

An X-axis pulse reforming section XPM 1 receives a pulse train (of A-phase or B-phase for instance) from the X-axis position detector XPG, to perform a pulse synchronization with an internal clock and a pulse conversion (for instance, into an up-down pulse train) to facilitate a pulse counting operation.

An X-axis position register XPR 2 counts the converted pulse train, to indicate the present position on the X-axis. When an external start signal switches to ON, the X-axis position register XPR starts the pulse counting operation after being reset to zero (0).

An X-axis compensation data memory XDM 3 can store in the form of a table a number of position data on the X-axis and compensation data on the Z-axis corresponding thereto. When the count value of the X-axis position register XPR coincides with the position data of the memory XDM, the latter outputs the corresponding Z-axis compensation data. (This output means can be readily realized by a method of connecting the outputs of the bits of the register XPR as address setting to the memory XDM.)

The X-axis position data and the compensation data in the X-axis compensation data memory XDM can be written or corrected by a data input section DI 4.

Figure 5:
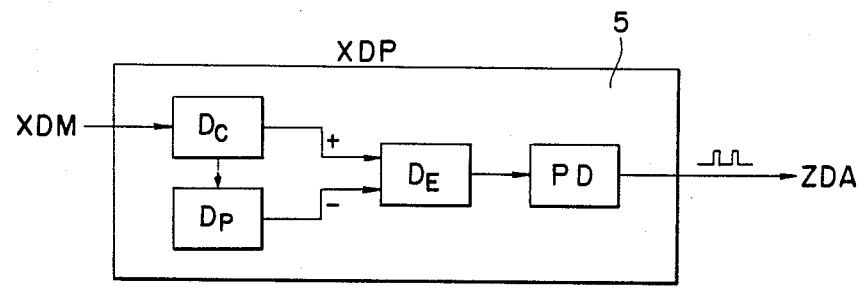
FIG. 5 is a block diagram showing an X-axis pulse generator section (XDP) in FIG. 4.

An X-axis pulse generator section XDP, as shown in FIG. 5 in more detail, calculates a difference data $D_E$ between a compensation data $D_C$ which is outputted currently by the memory XDM 3 and a compensation data $D_P$ which was outputted immediately before the data $D_C$. A pulse generating section PD distributes the number of pulses proportional to the data $D_E$ at a predetermined pulse speed. The compensation data $D_C$ which is used currently is stored as a compensation data $D_P$ for the next calculation.

Referring back to FIG. 4, a Z-axis pulse adder ZAD 6' is a circuit for adding the output pulse train of the X-axis pulse generator section XDP to the pulse train of the Z-axis position detector ZPG which has been shaped by a Z-axis pulse shaping section ZPM, or for subtracting the former from the latter. In this case, timing control is effected with the aid of the internal clock pulse so that the two pulse trains may not be overlapped, i.e., they are distributed at suitable time intervals.

A Z-axis pulse restoring section ZPD 7' operates to convert the output pulse train (for instance, an up-down pulse train) of the Z-axis pulse adder ZAD 6' into the original output pulse train (for instance, the A-phase or B-phase pulse train). The output of the Z-axis pulse restoring section ZPD is connected to a Z-axis position feedback input section of the numerical control device.

The following sections are completely the same in function as those 1, 2, 3, 5, 6' and 7' described above, respectively, and are arranged symmetrically with the latter:

Z-axis pulse reforming section ZPM 1'
Z-axis position register ZPR 2'
Z-axis compensation data memory ZDM 3'
Z-axis pulse generator section ZDP 5'
X-axis pulse adder XAD 6
X-axis pulse restoring section XPD 7.

These sections are connected as shown in FIG. 4.

Now, the operation of the compensation system with the sliding error compensation control section SECC will be described.

(a) The sliding error compensation control section SECC is coupled to the numerical control lathe as shown in FIG. 3.

When start input START of the section SECC is set to OFF, the counting operations of the X-axis position register XPR and the Z-axis position register ZPR are inhibited. As a result, the compensation pulse addition and subtraction functions of section SECC are inhibited. Under this condition, the operation of the numerical control lathe is the same as that of an ordinary numerical control lathe for which sliding error compensation control section SECC is not provided.

(b) Under this condition, a sliding error on the X-axis of the numerical control lathe is measured. More specifically, a slide position which can be readily obtained is determined as a reference original point on the X-axis, and sliding errors which occur when the slide is moved in the +X-axis direction and in the −X-axis direction are measured. To obtain the original reference point, it is convenient to use "reference point return function" which is generally known.

Figure 6A:
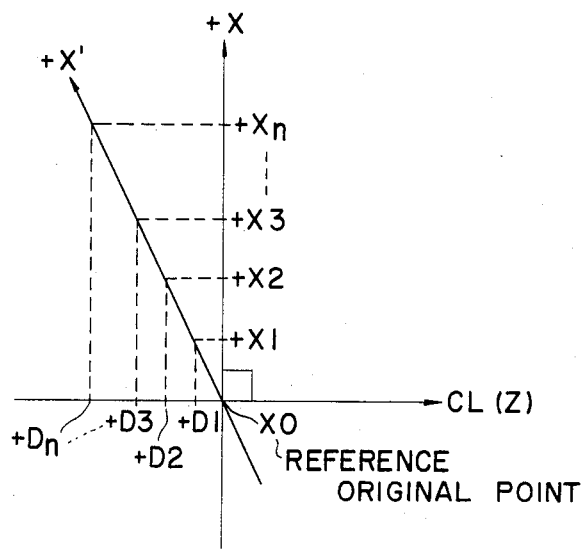
FIG. 6(a) is a diagram showing X-axis sliding error data being measured.
Figure 6B:
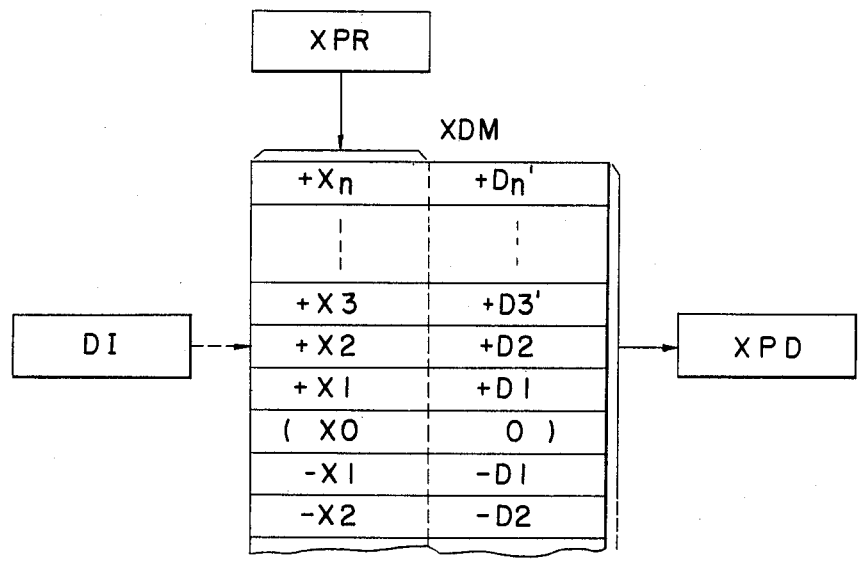
FIG. 6(b) is a diagram showing the storage of X-axis sliding error data in an X-axis compensation data memory.

The sliding errors thus measured are arranged as shown in FIG. 6(a). That is, in the case where the actual X-axis forms an angle with the center line of main spindle CL as indicated at +X', right-line angle errors (absolute values) +D1, +D2, +D3, . . . and +Dn corresponding to the X-axis positions +X1, +X2, +X3, . . . and +Xn are obtained. In the case where the X-axis winds, i.e., it has a straightness error, these values D are increased or decreased according to the amounts of winding. Thus, values +D1', +D2', +D3', . . . and +Dn' are obtained as the final sliding errors.

Similarly as in the above-described case, data are obtained for the −X-axis direction.

(c) Similarly as in step (b) described above, sliding error data including parallelism errors and straightness errors with respect to the center line of the main sprndle are obtained for the Z-axis.

(d) The X-axis position data +X1, +X2, +X3, . . . and +Xn and the corresponding sliding errors, i.e., the Z-axis compensation data +D1', +D2', +D3', . . . and +Dn', which are obtained in step (b), are stored in the X-axis compensation data memory XDM 3 with the aid of the data input section DI.

(e) The tool slide TS is set at the original reference point by carrying out a "reference point return" operation or the like.

(f) Under these conditions, the start input START of the sliding error compensation control section SECC is turned ON. The start input START may be automatically turned ON in association with a "reference return completion output signal". In response to the signal START (ON), the X-axis position register XPR and the Z-axis position register ZPR become ready to start counting the pulses trains from the sections XPM and ZPM, after being set to zero, respectively.

(g) Thereafter, an automatic or manual operation is carried out under the ordinary numerical control.

The sliding error compensation control section SECC carries out the operations described with respect to its internal functions above, and finally obtains the following effect:

As the slide moves on the X-axis, compensation pulses are applied to the Z-axis feedback pulse train according to the contents of the X-axis compensation data memory XDM, while compensation pulses are applied to the X-axis feedback pulse train according to the contents of the Z-axis compensation data memory ZDM, so that the position of the slide is compensated at all times, and accordingly the sliding errors of the tool slide are eliminated.

Figure 7:
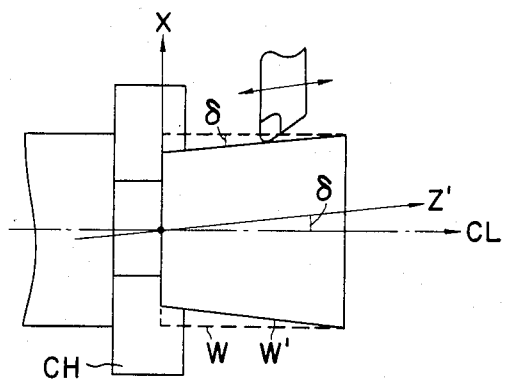
FIG. 7 is a diagram for a description of the application of a compensation function according to the invention.

One application of the compensation function according to the invention will be described with reference to FIG. 7.

When a cylindrical workpiece W is held with the spindle chuck CH of a numerical control lathe, the workpiece W may be deformed as indicated at W' depending on the holding force of the chuck CH. Employment of the compensation function according to the invention can increase the machining accuracy of the workpiece W' which is removed from the chuck CH after the machining operation, with the deformation eliminated. This can be achieved by employing the compensation function so that, as shown in FIG. 7, the slide on the Z-axis moves with the deformation angle δ of the workpiece W with respect to the spindle center line CL. However, it should be noted that, in this case, the actual Z-axis is completely in parallel with the spindle center line CL.

In the case where the actual Z-axis is not in parallel with the spindle center line CL, the error angle should be added to the aforementioned angle δ.

In practice, the amount of deformation δ can be obtained by a method of measuring machining dimensional errors of a sample workpiece in the Z-axis direction which has been cut without compensation. If the machining dimensional errors are added to the sliding errors stored in the Z-axis compensation data memory ZDM 3', then the machining errors due to the deformation of the workpiece W can be eliminated.

The invention has been described with reference to a numerical control lathe of two-axes control type; however, the technical concept of the invention is applicable to a numerical control machine tool having more-than-two-axes control.

Figure 8:
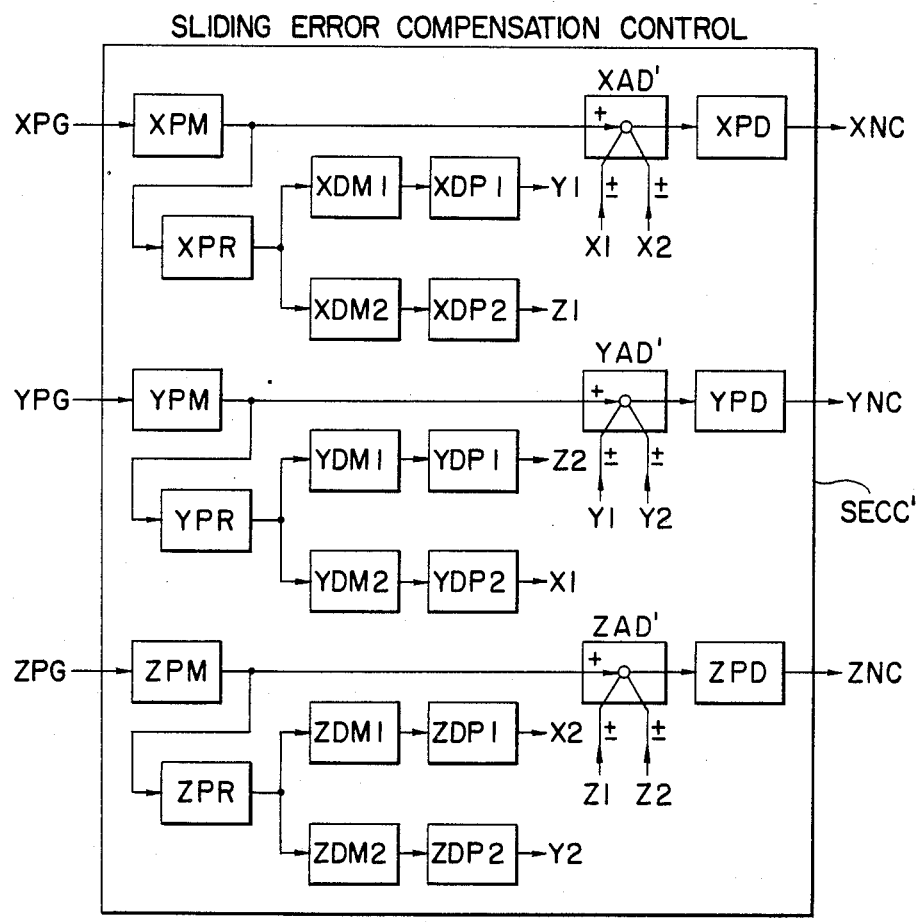
FIG. 8 is a block diagram showing another embodiment of the invention which is applied to a numerical control machine tool of more-than-two-axes control type.

FIG. 8 is a block diagram of another example of the sliding error compensation control section (SECC') according to the invention which is applicable to a machining center of the three-axes (X, Y and Z axes) control type.

In FIG. 8, reference character YPG designates a Y-axis position detector; YPM, a pulse shaping section; YDM1 and YDM2, first and second Y-axis compensation data memories, respectively; YDP1 and YDP2, first and second Y-axis pulse generator sections; YAD', a Y-axis pulse adder; YPD, a Y-axis pulse restoring section; and YNC, a Y-axis numerical control section. The same circuit elements as those described above are provided for each of the X-axis and Z-axis, as shown in FIG. 8.

Figure 9A:
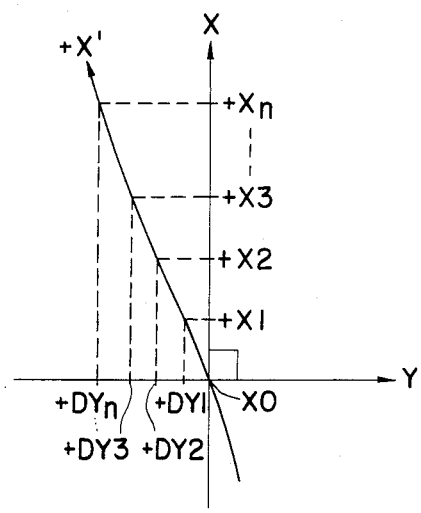
FIG. 9(a) is a graph showing actual +X'-axis sliding errors with respect to an ideal Y axis in the embodiment of FIG. 8.
Figure 9B:
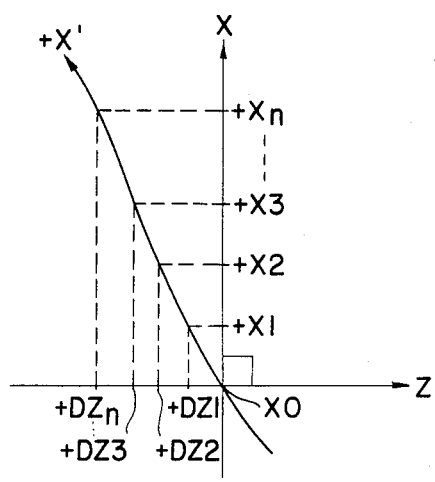
FIG. 9(b) is a graph showing actual +X'-axis sliding errors with respect to an ideal Z axis in the embodiment of FIG. 8.

In this case, two compensation data memories are provided for each axis, and compensation is effected by applying compensation pulses for the other two orthogonal axes. This will be described with reference to the X-axis by way of example. Actual $+X'$-axis sliding errors $+DY1$, $+DY2$, ... and $+DYn$ with respect to the ideal Y-axis as shown in FIG. 9(a) are stored in the first X-axis compensation data memory XDM1, and actual $+X'$-axis sliding error data $+DZ1$, $+DZ2$, ... and $+DZn$ with respect to the ideal Z-axis as shown in FIG. 9(b) are stored in the second X-axis compensation data memory XDM2, so that necessary compensation pulses are applied through the pulse generator sections XDP1 and XDP2 for the predetermined axes, respectively.

This can be said to the remaining Y-axis and Z-axis.

Thus, according to the invention, the following effects can be obtained:

The sliding error compensation control section as shown in FIGS. 4 or 8 can be manufactured separately from a numerical control device. Therefore, if the section is added to an available numerical control machine tool, then the machining accuracy of the latter can be remarkably improved.

Furthermore, if the sliding error compensation control section is formed in the numerical control section, then it can be provided as a numerical controd device having a sliding error compensation function. In this case, the X-axis pulse restoring section XDP and the Z-axis pulse restoring section ZDP in FIG. 4 can be eliminated, and therefore the sliding error compensation control section can be more readily formed.

What is claimed is:

1. A numerical control machine tool in which linear or rotary position detectors which produce incremental pulse trains with motion on control axes are provided as position feedback equipment for said control axes, respectively, which comprises:

a position register for detecting a current position on a first axis at all times in response to an output signal from a first-axis position detector;

a compensation data memory in which compensation data for a second axis corresponding to a number of positions on said first axis have been stored in advance, said memory outputting a compensation data corresponding to a position which coincides with a current position specified by said position register;

a pulse generator section for calculating a difference between said compensation data thus outputted and a preceding compensation data outputted by said memory and generating a pulse train the number of pulses of which is proportional to said difference;

a pulse adder for performing one of adding said pulse train obtained for said first axis to a pulse train which is obtained by converting an output signal of a second-axis position detector, and subtracting the former pulse train from the latter pulse train;

a pulse restoring section for converting a pulse train which is provided as a result of calculation by said pulse adder into a signal which is similar in form to the output from said position detector; and a compensation control section for outputting, as a position feedback signal for said second axis, said signal outputted by said pulse restoring section, and for similarly processing an output signal from said second-axis position detector to be outputted as a position feedback signal for said first axis, to have a sliding error compensation function.

2. A numerical control machine tool as claimed in claim 1, having means for performing compensation control for more than two axes.

* * * * *